United States Patent [19]

Szlam et al.

[11] Patent Number: 4,540,855
[45] Date of Patent: Sep. 10, 1985

[54] DETECTING SIGNALS WITHIN A PASSBAND ON A TELEPHONE LINE

[75] Inventors: Aleksander Szlam, Marietta; Chester P. Quinn, Chamblee, both of Ga.

[73] Assignee: Melita Electronic Labs, Inc., Atlanta, Ga.

[21] Appl. No.: 609,925

[22] Filed: May 14, 1984

Related U.S. Application Data

[62] Division of Ser. No. 415,711, Sep. 7, 1982, Pat. No. 4,477,698.

[51] Int. Cl.³ .............................................. H04M 1/00
[52] U.S. Cl. .................... 179/84 R; 179/81 R
[58] Field of Search ................. 179/81 R, 81 B, 81 C, 179/84 R, 84 A, 84 L, 84 SS, 84 T, 84 VF, 89

[56] References Cited

U.S. PATENT DOCUMENTS 3,930,127 12/1975 Warren et al. .................. 179/84 VF

*Primary Examiner*—James L. Dwyer
*Attorney, Agent, or Firm*—Jones & Askew

[57] ABSTRACT

An improved combination of a hardware and digital signal processing filter for detecting pick-up of a telephone call, solely through audio information on the telephone line. The apparatus employs a high gain band pass filter (28) with no automatic gain control, the output of which goes to a window comparator (30). The output from the window comparator (31) goes to a digital high pass filter (32) and from there to an integrator 37 for providing a digital output signal (40) indicative of the presence or absence on the telephone line of a signal exceeding a predetermined magnitude within the filter pass band. The digital signal is then processed by an intelligent digital filter having a set of predetermined threshold values of durations for states of the digital output signal, by which determinations of pick-up are made. The digital filter is adaptive and learns the durations high and low states of the digital output signal as they occur, subsequently checking for deviations from previously learned valid values. The digital filter includes a digital phase lock loop which will lock into a periodic but asymmetric pattern in the digital output signal and declare pick-up when lock is lost.

6 Claims, 11 Drawing Figures

DETECTING SIGNALS WITHIN A PASSBAND ON A TELEPHONE LINE

CROSS-REFERENCE TO RELATED APPLICATION

This is a division of application Ser. No. 415,711 now U.S. Pat. No. 4,477,698, filed Sept. 7, 1982, which is assigned to the assignee of the present application.

TECHNICAL FIELD

The present invention relates to signal processing in telephony and in particular is an improved device for the detection of a pick-up condition by a called party on a remote subscriber line based only on audio information from the calling party's line.

BACKGROUND OF THE INVENTION

In normal day-to-day human use of the telephone, the ear is relied upon to detect when a called party has answered a telephone call. The called party's pick-up is normally manifested either by a termination of the ring-back signal and a response such as "hello", or a termination of the ring-back and a period of silence. In PBX equipment, and devices for supervising calls from a central office to subscriber lines connected to the office, the supervisory signals present on the called party subscriber line may be used to detect a pick-up condition.

However, in more recent times, automatic dialing equipment has been developed, giving rise to the need of a device which may be placed on a calling party subscriber line and detect pick-up of the telephone set at a called party subscriber line, when the call is routed through any number of intermediate offices, including the toll network. Under such conditions, no supervisory signals are available at the calling location. Thus, detection of pick-up may be made only by the audio information on the line. Since the North American telephone network, and telephone networks throughout the world exhibit a wide variety of signal conditions, the audio information presented to the calling party subscriber line varies substantially. This variation is further exacerbated by the variety of noise conditions which may appear on any given call and the variety of human voice spectra, and intensity with which answering parties will speak, into the telephone set. Also, many people are in the habit of waiting for the party initiating the call to speak first.

Also, as is known to those skilled in the art, local offices at various locations in the country provide a variety of ring-back signals to the calling party. This is also true of some calls connected through PBX and Centrex equipment.

In the past, certain automated calling devices have detected special conditions upon pick-up. For example, automatic dialing intelligent modems are often configured to wait a certain period of time after the dialed number has been pulsed out for an appropriate carrier signal from an answering modem. If such is not received within a predetermined period of time; the modem will default to another mode of operation. It is also known to detect the frequency spectrum of the slow busy signal used in most of the United States.

Still more recently, automated dialing equipment has been used to initiate a large number of calls which may be handled by fewer persons than the total number of calls in progress. Such equipment is typically configured to include automatic dialers, which often dial sequentially through all the numbers in a particular exchange, and which initiate a "conversation" through the use of a prerecorded greeting and/or set of questions. These devices are used for telephone canvasing, advertising, and attempts to make direct sales to the called party.

While some subscribers have found these devices to be rather obnoxious, they are becoming firmly established in the stream of commerce and are quite useful. Automatic dialing equipment has been found to be particularly useful in contacting large numbers of people in both military and civil emergencies. It is in such a device that the present invention is primarily intended to be used.

As noted above, the basic problem with successful operation of such a device is that the machine must be configured to provide apparatus which, using solely audio information, can detect the pick-up of the called telephone set and proceed with the automated portion of the conversation. Normally, if the responses of the called party are satisfactory (which usually means that the telephone is not forthwith placed back on-hook), a human operator will intervene and continue with the business at hand.

Prior art systems for detecting pick-up in automatic dialing equipment have almost universally relied on signals processing schemes using automatic gain control to amplify the audio signals on the telephone line during periods of relative intensity of sound on the line. Average statistics for the spectral content of the human voice have been used to design filters which attempt to detect the presence of a human voice on the line. A common denominator of such schemes has also been that the parameters of the audio signal on the line at the calling party's location by which the decision whether to treat the call as answered are made, are fixed. Thus, audio conditions on the line at the automatic dialing equipment which do not fall within the static mathematical model of what sort of audio signal indicates a pick-up condition, and what sort of audio conditions indicate absence of pick-up, cannot be learned in real time by the apparatus. Furthermore, the reliance upon automatic gain control in the prior art makes such systems much more susceptible to responding to spurious noise present on the line.

While the statistics of average conditions indicating pick-up are useful and have been used to implement pick-up detectors which operate in a generally satisfactory manner, it is well known to those skilled in the art that there are several conditions under which the devices will make an improper decision. Indeed, within the industry there is a collection of known telephone numbers for which automatic pick-up detection is quite difficult, or has not been satisfactorily accomplished in the past. Thus, there is a need within the art for an automatic pick-up detector which will respond reliably, not only under normal conditions of the audio signal on the line at the calling location, but which will also respond to a wide variety of unusual signals to automatically detect that the called party has gone off-hook.

SUMMARY OF THE INVENTION

The present invention fulfills the above described need by providing an automatic pick-up detecting apparatus for use at a calling location which has been found to be considerably more reliable than prior art devices. The present invention overcomes the drawbacks of the prior art by the combination of a novel filtering arrangement to preprocess the audio information on the telephone line to a point which ultimately provides a digital output from the filter. The digital output from the filter is processed through a novel digital signal processing arragement which may be broadly characterized as a digital phase lock loop which will lock onto a periodic, but asymmetric, rectangular wave form. The locking range of this phase lock loop is such that audio conditions on the line when the call is initiated are learned by the apparatus as the call proceeds. Thus the scheme is adaptive for the conditions on the call in progress and does not rely on a fixed set of statistics which are then applied to all calls.

In one embodiment of the present invention, the average frequency content of of the filtered audio, prior to the stage at which the above noted digital output is presented, is stored and made available to the digital signal processor at substantially the same time changes in the digitized output from the entire filter arrangement occur. It will become apparent from the following description that, because the last stage of the output of the filtering arrangement which provides the digitized output amounts to an integrating arrangement, that spectral content information about a signal which causes a change in the digital output is available simultaneously with the information that the change in the digital output has occurred.

Thus it is an object of the present invention to provide an improved apparatus for detection of a pick-up condition at a called party telephone set from a calling location based solely upon audio information on the line at the calling location.

It is a further object of the present invention to provide an improved pick-up detection apparatus which is adaptive in nature and stores information about conditions present for each call relying on fixed statistics solely to eliminate extreme cases.

It is further an object of the present invention to provide an automatic pick-up detection apparatus which responds with greater reliability than prior art devices, and which eliminates the need for automatic gain control in the audio signal processing path.

Furthermore, it is an object of the present invention to provide an improved pick-up detector which includes a digital phase lock loop in the signal processing path which will lock onto a periodic but asymmetric signal characterized by a wide range of possible periods within the locking range.

These and other objects of the present invention will become apparent from the detailed description to follow.

DETAILED DESCRIPTION

Figure 1:
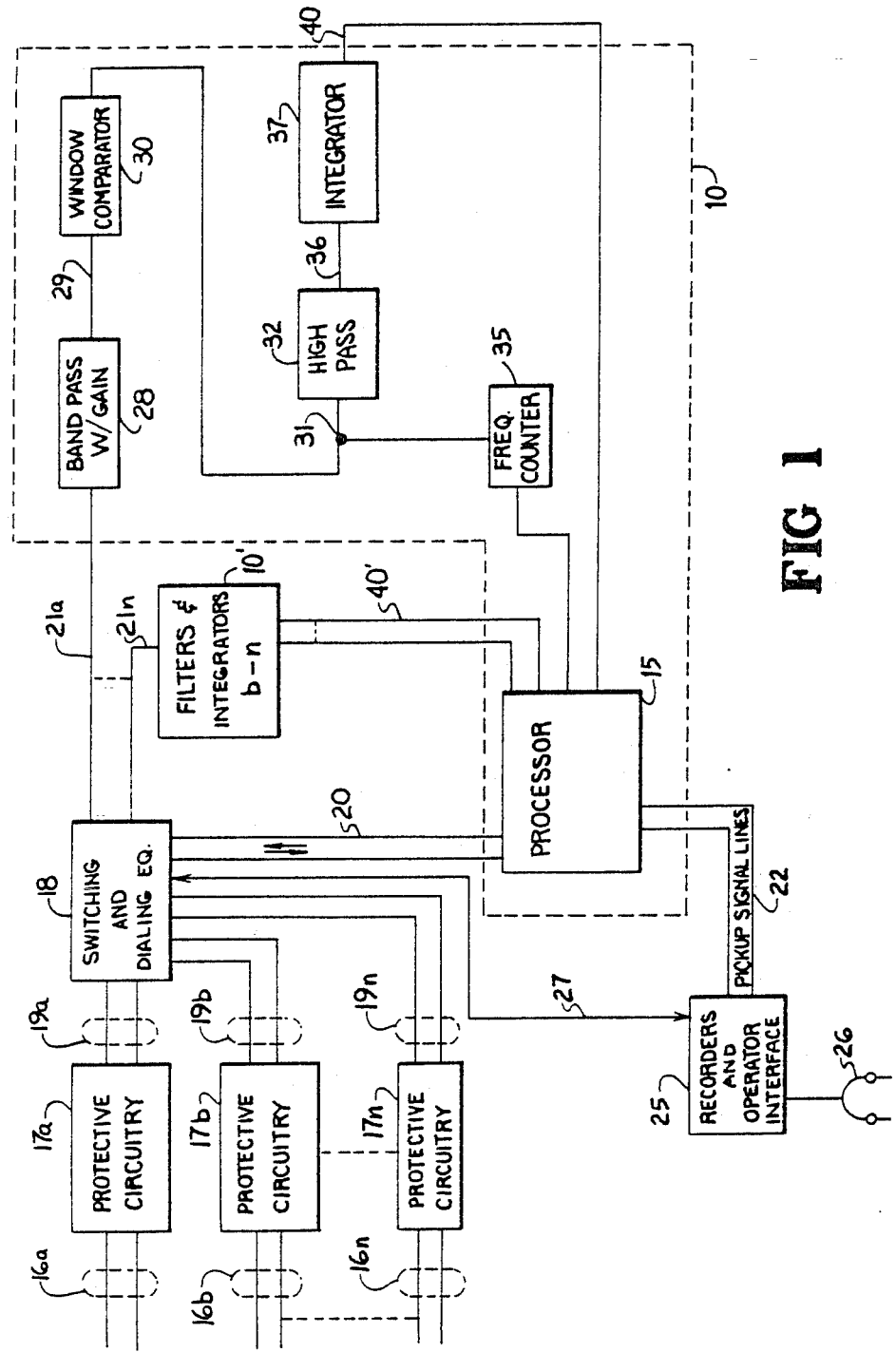
FIG. 1 is a block diagram of the environment of the present invention and the present invention.

Turning to the drawings in which like numerals reference like parts, the preferred embodiment of the present invention will now be described. FIG. 1 shows a block diagram of the present invention and the preferred environment thereof, an automatic telephone dialing apparatus. In FIG. 1 the components comprising the preferred embodiment of the present invention are surrounded by dashed line 10. A microprocessor 15 controls both the automatic dialing apparatus used in connection with the present invention, and performs the digital signal processing described in detail hereinbelow.

The automatic dialing apparatus is connected to a plurality of telephone subscriber lines 16a-16n. In construction of an actual embodiment of the present invention, n has been equal to four, but of course may be increased by increasing the speed at which processor 15 operates or using a plurality of parallel processors.

Each of lines 16 is connected to the automatic dialing apparatus through protective circuitry 17. Such protective circuitry meets the requirements of 47 C.F.R. Part 68, the Regulations of the Federal Communications Commission pertaining to attachment of devices to telephone lines in the United States. Such circuitry is well known to those skilled in the art. On the automatic dialer side of protective circuitry 17, the internal embodiments of the subscriber lines are shown as 19. Subscriber lines 19 connect to switching and dialing equipment shown as 18.

It will be appreciated by those skilled in the art that the switching and dialing equipment is under the control of processor 15 as indicated by a two-way bus shown as 20. Switching and dialing equipment 18 connects various ones of lines 19 to circuits embodying the present invention. Also switching and dialing equipment 18 performs the automatic dialing functions of the device under the control of processor 15.

Extending from switching and dialing equipment 18 is a set of internal audio connections shown as 21a-21n, with line 21a extending to the present invention as enclosed by dashed line 10. The filters and integrators associated with the present invention for lines 21b-21n are shown as a block as 10'. This is to point out that in an n line automatic dialer, n embodiments of the present invention will be used, although the processor performing the digital signal processing may be shared by multiple filtering arrangements. This will become apparent from the description of the filtering arrangements and the digital signal processor of the present invention to follow.

Extending from processor 15 is a set of pick-up signal output lines designated as 22 going to tape recorders and an operator interface designated as 25. A connection for a head set to a human operator is shown at 26. Lines 22 control the operation of a plurality of recorders within block 25 containing messages which will be played out upon a decision by processor 15 that a pick-up on a particular line has been detected. As described in the background of the invention, such an arrangement is common to determine if the called party is responding in a satisfactory manner to initiation of the conversation. Once such a condition has been detected, one or more operators at station 26 will be alerted to this fact and may proceed with an actual human to human conversation. Recorders and operator interface 25 are connected by audio and control lines to switching and dialing equipment 18, as shown at 27 on FIG. 1.

Turning next to the elements of the present invention within dashed line 10, line 21a will be understood to embody an audio connection between one of subscriber lines 16 through switching and dialing equipment 18. Line 21a is the input to a band pass filter with gain 28. The output of this filter appears on line 29 as the input to a window comparator 30. The output from the window comparator appears at point 31, where it provides input to both digital high pass filter 32 and frequency counter 35. The output of high pass filter 32 appears on line 36 as an input to integrator 37.

As will become clear from the description below, the output of integrator 37 is a digital output which appears on line 40 which in turn extends to processor 15. It will be understood that the output of line 40 and the equivalent lines from filters and integrators 10' shown as 40' on FIG. 1, are connected to the data bus of processor 15 through tristate buffers. The control inputs of such buffers are commonly assigned an address in the system input/output address space so that the state of the input to the buffers may be read onto the data bus under the control of processor 15 in a well known manner. However, the details of such buffers have been omitted from the drawings of the present invention for the sake of clarity.

Figure 2:
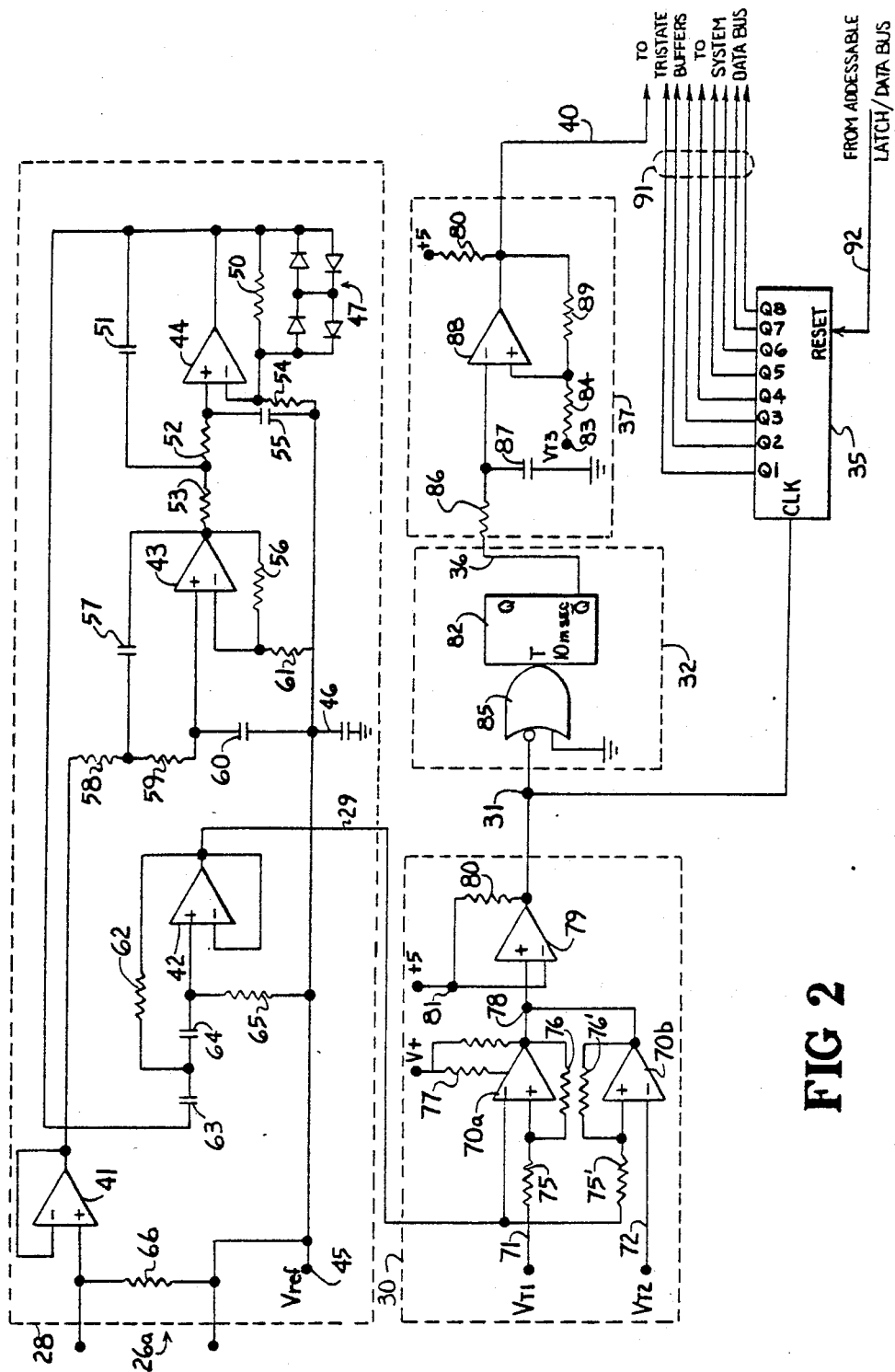
FIG. 2 is a circuit diagram of the filtering and integrating apparatus of the present invention.

Turning next to FIG. 2, the preferred embodiment of the filtering and integrating apparatus of the present invention is shown. Each of the elements shown as blocks 28, 30, 32, and 37 in FIG. 1 is surrounded by a correspondingly referenced dashed line in FIG. 2. Band pass filter with gain 28 has as its input line 21 from switching and dialing equipment 18 (FIG. 1). The preferred embodiment of band pass filter with gain 28 is constructed around four operational amplifiers 41–44. The frequency and gain control components of this filter provide a gain of approximately 42 dB between line 21 and line 29. Inspection of FIG. 2, and the values for the frequency and gain control elements will indicate that the preferred embodiment is a multipole Chebyshev filter having 3 dB cutoff frequencies of approximately 200 hertz at the low end of the pass band, and 700 hertz at the upper end of the pass band. It will be appreciated by those skilled in the art that such filters exhibit equal ripple in the pass band and the stop band. Of course other filtering functions, such as a multipole Butterworth filter could be used to construct embodiments of the present invention.

It should be noted that the negative conductor of internal subscriber line 21a is connected to a point 45 labeled Vref. It should be appreciated by those skilled in the art that, in the preferred embodiment, the voltage of this point is maintained at the midpoint of the voltage drop between the positive power supply rail and ground used in the power supply connections (not shown) to operational amplifiers 41–44. A noise bypassing capacitor 46 is shown as connected between point 45 and ground. Feedback resistor 50, connecting the output of amplifier 44 to its inverting input, is shunted by a diode array shown as 47. Since the gain of the stage constructed around operational amplifier 44 increases linearly with the value of resistance 50, it will be appreciated that diode array 47 shunts resistance 50 to prevent saturation of the output stages of operational amplifier 45. While this arrangement does not prevent (and does not need to) the clipping of the output signal, it does prevent the output transistors internal to amplifier 44 from going deeply into saturation. This is necessary so that a long recovery time from a saturated condition will not prevent filter 28 from properly responding to inputs. It is important that operational amplifiers 41–44 have extremely low leakage current and offset voltage characteristics. The significance of this will become apparent from the apparatus connected to line 29, the output of filter 28, described hereinbelow.

Since filter 28 is an active filter constructed in a known manner using RC networks and operational amplifiers, the details of the frequency and gain controlling elements will not be described herein. However, the values for resistances and capacitances shown in filter 28 designated by numerals 50–65 are set forth in the following Table 1. Unless otherwise noted in the table, all values of resistance are in kilohms and all values of capacitance are in microfarads.

TABLE 1

| Reference Numeral | Device Value |
|---|---|
| 50 | 510 |
| 51 | .0047 |
| 52 | 43 |
| 53 | 7.5 |
| 54 | 56 |
| 55 | 0.1 |
| 56 | 510 |
| 57 | .0047 |
| 58 | 9.1 |
| 59 | 39 |
| 60 | 56 |
| 61 | .01 |
| 62 | 43 |
| 63 | .022 |
| 64 | .022 |
| 65 | 100 |
| 66 | 100 |

The output of filter 28 appears on line 29 as the input to window comparator 30. Window comparator 30 is constructed in a known manner using a pair of comparators 70a and 70b, preferably embodied as two sections of a type LM 339 quad comparator integrated circuit. A pair of input lines 71 and 72 carry two threshold input voltages designated as VT1 and VT2, respectively.

It is to be understood that voltages VT1 and VT2 are derived from the same power supply as the reference midpoint voltage which appears on line 45, and that the voltage values for the thresholds on lines 70 and 72 straddle the value of Vref in a substantially symmetric manner. Lines 71 and 72 are coupled to the positive inputs of comparator 70 by a pair of 3.9 kilohm resistors designated as 75. Positive feedback around each comparator section is provided by one of a pair of one megohm resistors designated as 76, with a 10k pull-up resistor 77 being connected to the positive power supply. The outputs of the two comparators are connected together at point 78.

The voltage values for the thresholds on lines 71 and 72 are chosen such that a signal swing must appear on line 21a from one of telephone subscriber lines 16a (FIG. 1) which exceed −40 dBm signal level on the telephone line. Thus, noise present on the telephone line which passes through to line 21a which is lower than a level of −40 dBm will not cause window comparator 30 to change state. Thus window comparator 30 serves the function of a level sensitive noise filter. From the values of resistances 75 and 76 given above, it will be appreciated that the arrangement exhibits considerable hysteresis which is approximately twenty-five millivolt with respect to 0 dBm on the phone line volts in the preferred embodiment.

Reflecting for a moment on the combined action of filter 28 and window comparator 30, the following will be appreciated. The output on line 29 from filter 28 is an amplified band limited signal which, for sinusoidal input is symmetric about the voltage Vref. Since the thresholds of the window of window comparator 30 define a window for signals less than −40 dBm on the phone line, it will be appreciated that the window comparator will switch states twice each time the voltage on line 29 passes completely across the window. Thus, there will be two changes of state at point 78 each time the voltage swing on line 29 comes to and drops below a value exceeding −40 dBm. Since the gain of filter 28 is high, it will be readily appreciated that the switching of states at point 78 is effectively detecting "zero crossings" of the amplified form of the signal on line 21a where the "zero" is any signal level on the telephone line lower than −40 dBm.

Point 78 is connected to another section of the above-referenced quad comparator, shown as 79, having a pull-up resistor 80 and its inverting input terminal connected to a supply voltage of plug five volts indicated at 81. It will be appreciated the output from comparator 79 provides a pulse at point 31 each time the signal on line 29 passes through the window defined by the threshold voltages.

Considering for a moment that filter 28 has a minus three dB point of approximately 200 hertz at the low end of the pass band, it will be appreciated that while the output of the filter is significantly curtailed at 100 hertz, the large gain of filter 28 will cause sufficient passing of a 100 hertz signal out to line 29 to continue to provide pulses at point 31.

The pulses from the output of window comparator 30 at point 31 are provided as the input to digital high pass filter 32. As may be seen in FIG. 2, high pass filter 32 is embodied as a one shot multivibrator 82 having an input triggering gate 85, as shown. In the preferred embodiment, one shot 82 and gate 85 are embodied as one section of a type MC14538B CMOS retriggerable one shot currently manufactured by Motorola Semiconductor Products. As noted on one shot 82, frequency determining elements (not shown) are connected thereto giving the one shot a period of ten milliseconds. The negated form of the output from one shot 82 appears on line 36. Since one shot 82 has been denoted as high pass filter 32, it will be appreciated that the output of point 36 has, by this point in the signal path, ceased to be an analog representation of the input signal. The one shot is a high pass filter in the sense that a triggering signal below 100 Hz will not keep its output constantly in one state. However, it will be readily appreciated that one shot 82 will remain triggered, and thus line 36 will stay low, so long as pulses appear at point 31 at least every ten milliseconds. Thus it will be appreciated that the continued existence of a low output on line 36 indicates that signal of a frequency of 100 hertz or greater is present on line 29 and continuing to activate window comparator 30 and thereby to retrigger one shot 82 before it times out.

The output of line 36 is provided to integrator 37 consisting of resistor 86 and capacitor 87. In the preferred embodiment, the combination of values for these components is chosen to have a time constant of forty-three milliseconds. The output of the integrator is provided as an input to comparator 88, which is the fourth section of the above-referenced quad comparator, having a one megohm feedback resistor 89 and a 100K resistor 84 connected to a threshold voltage at 83 providing hysteresis and positive feedback. A pull-up resistor 90 attached to its output on line 40. The output on line 40 is the digitized output of the signal path described above in connection with FIG. 1.

From the foregoing, the following will be appreciated. One shot 82 embodies a high pass filter which will provide a digital output on line 36 (a logical zero) so long as a triggering input signal of 100 hertz or greater is provided as the output of filter 28 on line 29. Since integrator 37 has a time constant which exceeds the period of one shot 82 by a factor of slightly more than four, it will be appreciated that a period of about five times a period of one shot 82 must pass with line 36 in its high condition before capacitor 87 charges to a point sufficient to cause the output of comparator 88 to change states thus changing the logical state on line 40. Thus it will be appreciated that integrator 37 provides what may also be considered a time delay between the termination of firing pulses at point 31 and a change of output of line 40.

Note also that point 31 is connected to the clock input of a counter 35, the outputs of which appear as a set of lines 91. The reset line is provided at 92. As may be seen from the notation on FIG. 2, lines 40 and 91 are connected to tristate buffers to the system data bus, which is in turn connected back to processor 15 (FIG. 1). Line 92 comes from an addressable latch also connected to the data bus. Thus it will be apparent that lines 40, 91 and 92 are connected in a conventional manner as addressable inputs and outputs to the data bus associated with processor 15.

Reflection on the nature of the input at line 21a and the operation of the circuitry shown in FIG. 2 will indicate the nature of the output on lines 40 and 91. It is an important improvement of the present invention that filter 28 is designed to reject low frequency noise yet have sufficient signal level pass through to line 29 in the region between 100 and 200 hertz (which is on the lower slope of the filter frequency characteristics) so that a 100 hertz signal of any significant magnitude will activate window comparator 30. It should be recalled from the discussion above that the upper three dB point of filter 28 is at approximately 700 hertz with usable output (that is that which will trigger window comparator 30) extending to approximately one kilohertz.

It will further be appreciated that glitches of noise appear on the line which exceed a signal level of −40 dBm, during a period where the applied audio signal to the line is silence, four or more such glitches spaced not more than ten milliseconds apart must appear in order to retrigger one shot 82 the requisite number of times to discharge capacitor 87 causing a change of the output state on line 40. Such occurrences are unlikely and rare.

As will be known by those skilled in the art, all of the following types of tones used in the North American telephone network lie in the band between 100 hertz and 750 hertz. The only exception to this statement is the possible use of a 60 cycle ringing signal from a comparatively ancient central office. Since virtually all of the older central offices in use today have a minimum frequency of ringing signal of 100 hertz or a 60 hertz signal modulated by a signal within the passband, it may safely be stated that virtually all ringing signals used in North America lie within the above recited pass band. Also, busy signals as well as the tone triplet sequence which is generated when a call is intercepted, lie within the pass band. Furthermore, it is well known that all normal human voices, both male and female have a spectral output which exhibits a strong peak in the region of 750 hertz during speech.

The confluence of this pass band, which includes the voice and tone signal described above, and the circuitry shown in FIG. 2, as applied to the digital signal processor in the present invention, will now be described.

Figure 3A:
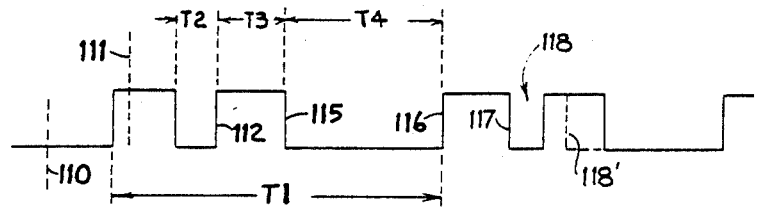
FIG. 3, consisting of FIGS. 3A-3C is a timer diagram of outputs on line 40 under various conditions.
Figure 3B:
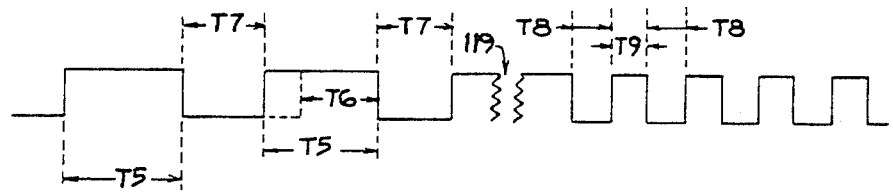
Figure 3C:
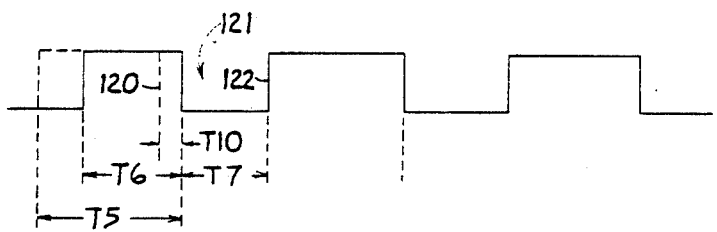

FIG. 3, consisting of FIGS. 3A–3C, shows various possibilities for waveforms appearing on line 40 (FIG. 2). FIG. 3A shows a typical signal pattern for a double ring signal. Keep in mind that the waveforms shown are the duration of high and low outputs from the digital signal on line 40. Since the actual frequency of the double ring signal burst is within the pass band of filter 28 (FIG. 2), all that the apparatus is concerned with from this point out is the duration of high and low intervals corresponding to the presence and absence of a signal within a pass band.

As used herein, learned and acquired values, refer to values which are stored and accumulated which correspond to the durations of the high and low states. Thus "first learned high" refers to storage of a signal representing the duration of a logical one on line 40 (FIG. 2).

As may be seen from FIG. 3A, the high low pattern for the double ring signal is periodic with period T1. However, it will be readily appreciated that the signal is asymmetric within its total period of periodicity (T1), being characterized by two high states of duration T3 and a short low state, duration T2, and a long low state of duration T4. As indicated above, the digital signal processor of the present invention includes a digital phase lock loop which will lock onto such an asymmetric but periodic waveform. The loss of lock, as explained below, is interpreted as a pick-up.

As will be understood by inspection of FIG. 4, the device operates as follows. First, the digital signal processing apparatus of the present invention always learns the first high state encountered as the first learned state. For example, if the line upon which a call is being placed were connected to a double ring bus at a local office at the point in time indicated as 110, no learning of the first encountered low period would take place. If the line is connected at a point in time indicated at 111, the duration of the remaining portion of the first high (which will be less than period T3) will be learned assuming it is greater than what is defined dynamically as the minimum interval for a valid high. This is also referred to as the glitch interval.

Next, the output on line 40 changes, and the first low state encountered of duration T2 is acquired by the filter. Upon the rising edge 112 of the second high, the machine is forced into its internal state 2 and begins processing its previous learned high and the first acquired low. It should be noted that the first acquired, or learned, low of duration T2 is defined by the digital filter shown in FIG. 4 as what is called a "learned low two", designated as the variable L2STAT. This is because the comparison between any low state currently being acquired by the digital filter and a previous low state, is always compared to what is defined as "learned low one", which is variable L1STAT in the flow chart. When the second high state is acquired for duration T3, it replaces the previous value of the learned high (LHSTAT) and, after the falling edge shown as 115, the next acquired low state begins to accumulate in the counter designated as CSTICK.

Keeping in mind that the first acquired low (duration T2) was designated as learned low two, it will be appreciated that the first acquisition of the long low period of the double ring signal is compared to a learned low one register which is currently empty. The fact that it is empty can be detected from the state counter variable shown in the flow chart. Thus, a second acquired low, of a duration different from the first acquired low (now defined as learned low two), is accepted as valid. Upon the next rising edge, designated as 116, a new high state is acquired.

Since, in the example of FIG. 3, it compares favorably with the previous learned high, the next falling edge designated as 117 has the following consequences. First, it should be kept in mind that the entire example assumes that no changes of state less than the defined glitch intervals occurred. The learned high between edges 116 and 117 compares favorably so the device assumes that the now learned double ring signal is still on the line. On the falling edge 117, the values of the learned low one and learned low two are switched. In other words, the values of variables L1STAT and L2STAT are interchanged. As will become apparent from inspection of the flow chart of FIG. 4, once state one has been reached in the digital filter, the values of these variables are interchanged upon each occurrence of a high to low transition where the low was determined to be valid because it exceeded the glitch interval.

Since the values are interchanged at falling edge 117, it will be appreciated that the value now stored in the register containing the learned low one value is that which was previously stored in learned low two: a number corresponding to a duration T2 of the first acquired low. Thus, the low period designated as 118 is being compared to the value now designated within the filter as first learned low (L1STAT). It should be noted that the digital filter is constructed so that the value of any low period currently being acquired is always compared to the variable defined as the first learned low. Thus the rationale for defining the first acquired low as learned low two.

If instead of being a short inter-ring signal, the low period shown as 118 were extended to be a predetermined percentage greater than period T2, as shown by example at phantom line 118', pick-up will be declared. From the foregoing it will be appreciated that the signal processing apparatus of the present invention has the following features. First, a valid pick-up can be declared without awaiting the next change of state (the next low to high transition in the example). Secondly, the locking of the digital phase lock loop onto an asymmetric signal means that pick-up can be declared when the telephone is lifted from the cradle during a short low period without waiting to see if a low period exceeding the duration of the longest learned low (T4) occurs. Furthermore, it will be readily appreciated that the digital phase lock loop will likewise lock onto a symmetric period signal since, in that case, both learned low values will be equal.

Turning next to FIG. 3B, a situation which is not common but occurs with some regularity is depicted. The lefthand portion of FIG. 3B represents the duty cycle of a typical ring signal. The ringing intervals are shown as T5 with the inter-ring silence period shown as T7. Modern electronic offices have two functional features which cause the situation of FIG. 3B to occur. When dialing is completed, the central office will look up in an array of status registers, the status of the number called in order to connect an appropriate signal back to the calling party. Also, such offices are constructed on the statistical assumption that the total number of connecting paths needed for adequate operation is considerably less than the total number of potential calls completed between subscriber lines and trunks connected to the office at any given time. During peak traffic loads, the assumptions upon which the second design choice were made become invalid and calls cannot be completed through the switching matrix.

The inventors know that the signal condition shown in FIG. 3B occurs and believe it results from the following sequence of events. The audio signal to the calling party is initially a portion of a ring-back signal which abruptly gets connected to a busy signal. This occurs because the central office initially connects the calling party to the ringing bus upon examination of the status register, whereby it determines that the called party's line is not busy. However, shortly thereafter, the central office will detect the fact that all connections through the switching matrix which may reach the called party are busy and thus will switch the audio signal on the calling party's line from the ring-back signal to a busy signal.

In FIG. 3B, the duty cycle of the ring signal on the ring bus is shown with the ring intervals being designated as T5 and the inter-ring periods having duration T7.

Assume for example that a calling party is connected to the ringing bus for a period T6. At the point in time indicated as 119, the switch from the ring bus to the busy bus is made wherein the periodic busy signal having tone durations of T9 and periods of silence of duration T8 is connected. As will be explained in connection with FIG. 4, the digital filter of the present invention detects this switch and will eliminate the learned high state of duration T6, and the first acquired low state (a learned low two of duration T7), and revert to state one to learn the new pattern of the busy signal. Shortly after this is learned, the fact that the central office has returned a busy signal will then be detected without having the initial application of the ring-back signal cause the device to make an improper decision.

FIG. 3C illustrates a feature of the present invention discussed in connection with FIG. 3A. FIG. 3C shows the duty side call of a typical ring signal with ring periods of duration T5 and inter-ring periods of duration T7 as defined in FIG. 3B. From the discussion in connection with FIG. 3A, it will be appreciated that if the ring signal is cut onto the line from which the automatic dialer is calling so as to have initial duration T6, this will be learned as the learned high with the duration of T7 following as the first acquired low. The next occurrence of the ring signal of duration T5 will cause the new and greater value of the learned high to be used in the filter.

If the line is cut to the ring bus at time 120 so that the initial high duration is time T10, and T10 is less than the glitch interval, this will be ignored. Thus, the low period shown as 121 on FIG. 3C will likewise be ignored since the digital filter always learns the first occurring high state greater than the glitch interval, as the first learned value.

Continuing with the example, the next high state which begins with rising edge 122 will be acquired as the learned high. From thence the apparatus will acquire the values for the high and low times as described hereinabove. Thus, it will be appreciated that the filter operates properly irrespective of whether the line upon which the call is being placed is cut to the ring bus during an inter-ring period of silence, during a portion of the application of the ring signal of a duration greater than the glitch interval but less than the full duration of the ring signal, or initially for a short period of the ring signal less than the glitch interval. The fact that the first learned state is always a high state (in excess of the initially defined glitch interval) assures this operation.

Also, from inspection of FIG. 4, it will become apparent that once a valid high and a valid low have been learned, and the signal on line 40 is at least 200 milliseconds into its second high, the glitch intervals (variables HGLTCH and LGLTCH) are redefined to a shorter period of approximately 150 milliseconds.

The initial choice of 200 milliseconds is made because the glitch noises on the telephone line during initial connection of a call tend to be of longer duration when the call is being set up. 200 milliseconds was chosen as the preferred value because it is 20% less than the fastest period associated with the fastest busy signal used in the United States. Thus, the fastest busy signal to be encountered by the apparatus will still be learned as valid.

Turning next to FIG. 4, a flow chart of the digital filter of the preferred embodiment is shown. FIG. 4 consists of FIGS. 4A, 4B and 4C. It will be appreciated that the flow chart of FIG. 4 represents instructions executed by processor 15 (FIG. 1) which, in the preferred embodiment, is a Z80 microprocessor currently manufactured by Zilog Incorporated of Cupertino, Calif. As noted above in connection with FIG. 1, the preferred embodiment of the present invention is one in which four phone lines may be operated by the automatic dialer simultaneously (on a time division multiplexed basis). In the preferred embodiment, a counter timer connected to the Z80 is periodically set with a value which will be counted down in 8.192 milliseconds. The underflow of this counter will generate an interrupt for a service routine when the counter underflows. Thus, the digital filter associated with each line being serviced by the automatic dialer will perform the routine shown in FIG. 4 every 8.192 milliseconds. Thus it will be appreciated that the value of the output on line 40 (FIG. 2) is read every 8.192 milliseconds.

This interval is noted as the "tick interval", and the variable TICK is considered to be a flag which is set when the internal interrupt is generated. Thus it will be appreciated that all integer values assigned to variables on FIG. 4 (except the state counter, STCTR), or to which integer variables are compared in FIG. 4 may be converted into the number of milliseconds used in the preferred embodiment by multiplying the integer value shown by 8.192.

The flow chart of FIG. 4 is quite complete and a detailed description of every possible path through the flow chart would be of extreme length and is considered unnecessary to a person of ordinary skill in the art since, with the definitions set forth in Table 2, FIG. 4 is basically self-explanatory. However, certain salient features of the digital filter as shown in the flow chart will be explained. The following table sets forth the names of the variables used in the digital filter of the present invention, the type of each variable, and a definition of the significance of the variable. The variable type is defined as either I for integer variables, or B for Boolean. The entire point of the digital filter is to arrive at either the setting of the flag variable PICKUP indicating that a valid pick-up by the called party has been declared, or the flag variable FASTBSY. As shown in Table 2, the fast busy variable is indicative of a fast busy signal. It will further be apparent to those skilled in the art that the combination of a logical one for both VALIDR and FASTBSY is indicative of a slow busy signal on the line. In the preferred embodiment, no distinction is presently made between fast busy and slow busy conditions although uses of the present invention will suggest themselves to those skilled in the art for which the distinction may be significant. Therefore, the basic decision made by the digital filter from the output on line 40 is either to set Boolean variable FASTBSY or Boolean variable PICKUP.

TABLE 2

| Variable | Type | Definition |
|---|---|---|
| L1STAT | I | Duration of first learned low state. |
| L2STAT | I | Duration of second learned low state. |
| DE | I | Temporary storage. |
| CSTICK | I | Current count in TICK counter. Ticks occur a 8.192 msec. |
| STHOLD | I | Duration of period acquired prior to current period being acquired. |
| HGLTCH | I | Minimum duration of valid high. |
| LGLTCH | I | Minimum duration of valid low. |
| STCTR | I | State counter. |
| LHSTAT | I | Duration of pevious learned high state. |
| GENMAX | I | Returned value from GENMAX subroutine. |
| GENMIN | I | Returned value from GENMIN subroutine. |
| INP | I | Input value to subroutines. |
| LSTATE | B | Value of last state (high or low). |
| RING | B | Current value of input from line 40. |
| TICK | B | Flag indicating that internal interrupt has occurred. |
| VALIDR | B | Flag set to indicate valid high within range of ring signal durations. (valid ring) |
| DBRNG | B | (Double Ring) Flag set when asymmetry of two learned low values indicates probable double ring signal on line. |
| FASTBSY | B | (Fast Busy) Flag for learned high duration within range for fast busy signals. |
| PICKUP | B | Flag set when valid pickup of telephone by called party is declared. |

Figure 4A:
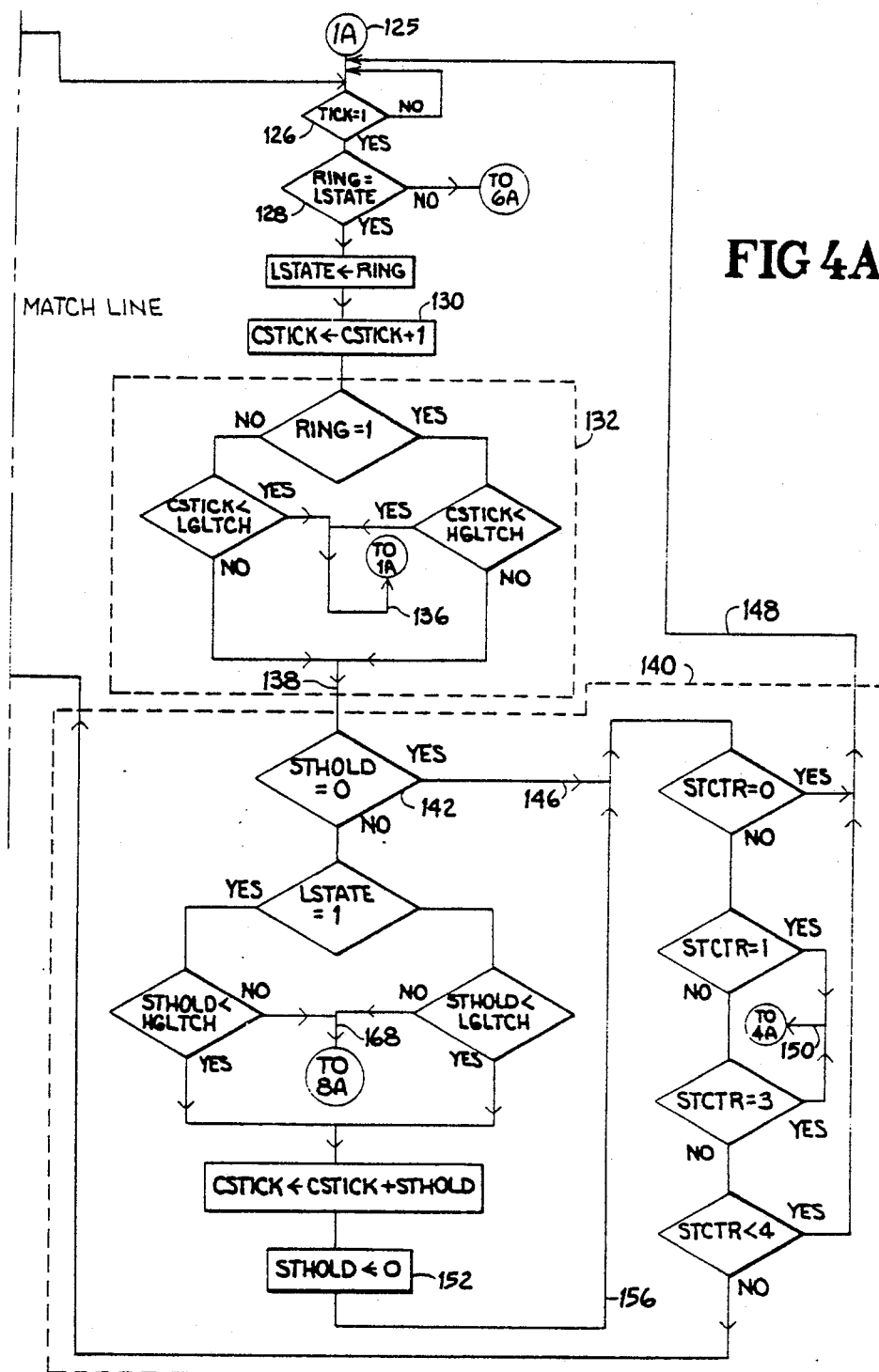
FIG. 4, consisting of FIGS. 4A-4D is a flow chart of the operation of the digital filter of the preferred embodiment.

Turning first to FIG. 4A, entry point 1A designated as 125 is the basic entry point of the filter routine. Decision 126 represents a waiting loop for variable TICK to go to one, indicating that the interrupt has occurred. Decisional step 128 tests whether the state of line 40 (RING) is in the same state it was for the last interrupt (LSTATE). If a transition has occurred, the filter exists to 6A which is shown on FIG. 4B.

Assuming that it is in the same state, the tick counter, CSTICK is updated at 130, and a test routine enclosed by dashed line 132 is entered. The steps performed by the digital filter within 132 are to test to see if the variable RING, the state on line 40, is equal to one and, depending on the results of the test, to check if the current state of the tick counter exceeds the appropriately defined glitch interval. In either case, when the tick counter is less than the glitch interval, the filter returns to entry point 1A as shown by branch 136. If the current count exceeds the appropriate glitch interval, branch 138 is taken to a set of test steps surrounded by dashed line designated 140.

At this point it is appropriate to point out a feature of the preferred embodiment of the digital filter shown in FIG. 4. The state counter defines an integer state number in which the filter is currently operating. From the previous description of the filter operation in connection with FIG. 3, including the fact that the first learned value is always the first occurring high, it will be appreciated that the filter changes states (as defined by the state counter variable STCTR) is an odd number after acquisition of a valid high state, and an even number after acquisition of a valid low state.

Since the change of state (defined by the state counter variable) occurs after tests are made on the last acquired valid period, it should be understood that the processing of information by the digital filter in any particular state defined by the state counter is asynchronous to the acquisition of the next time period which is occurring through the incrementing of variable CSTICK. With that in mind, the rationale of the test within the area bounded by dashed line 140 will become clear. Note that variable STHOLD is the duration of the last acquired period prior to a change of the ring variable, but does not necessarily represent the acquisiton of a valid period to be learned.

From branch 138 the value of STHOLD is tested for a zero value at 142. If this test is true, yes branch 146 is taken to a series of tests of the value of the state counter. If the state counter is zero, the filter returns through branch 148 to entry point 1A. If the state counter is in a state indicating that a valid high has been acquired, and acquisition of a low is in progress, the branch to point 4A (FIG. 4A) is taken at 150.

If test 142 is negative, a test for state hold (STHOLD) exceeding the appropriate glitch times is made. If they are less than the glitch times, the value of state hold is added to the value of the tick counter and state hold is cleared at 152. Then the series of tests of the state counter is entered via branch 156.

It may be seen from inspection of FIG. 4 that, if the variable state hold is equal to zero, what has previously occurred is a change of state less lasting than the appropriate glitch interval. This acquired, but invalid, change of state is simply added to the previously acquired time for the previous condition of line 40, and the STHOLD variable is cleared. This occurs either at step 152 on FIG. 4A, or in a return from a series of steps designated 158 (FIG. 4B). Thus it will be appreciated that each occurrence of a change of state on line 40 does not necessarily means that the state counter will be incremented, and further demonstrates that changes of state on line 40 less than the glitch interval are merely treated as glitches, and a continuation of the previously acquired duration of the condition of line 40 which existed before the glitch.

Figure 4B:
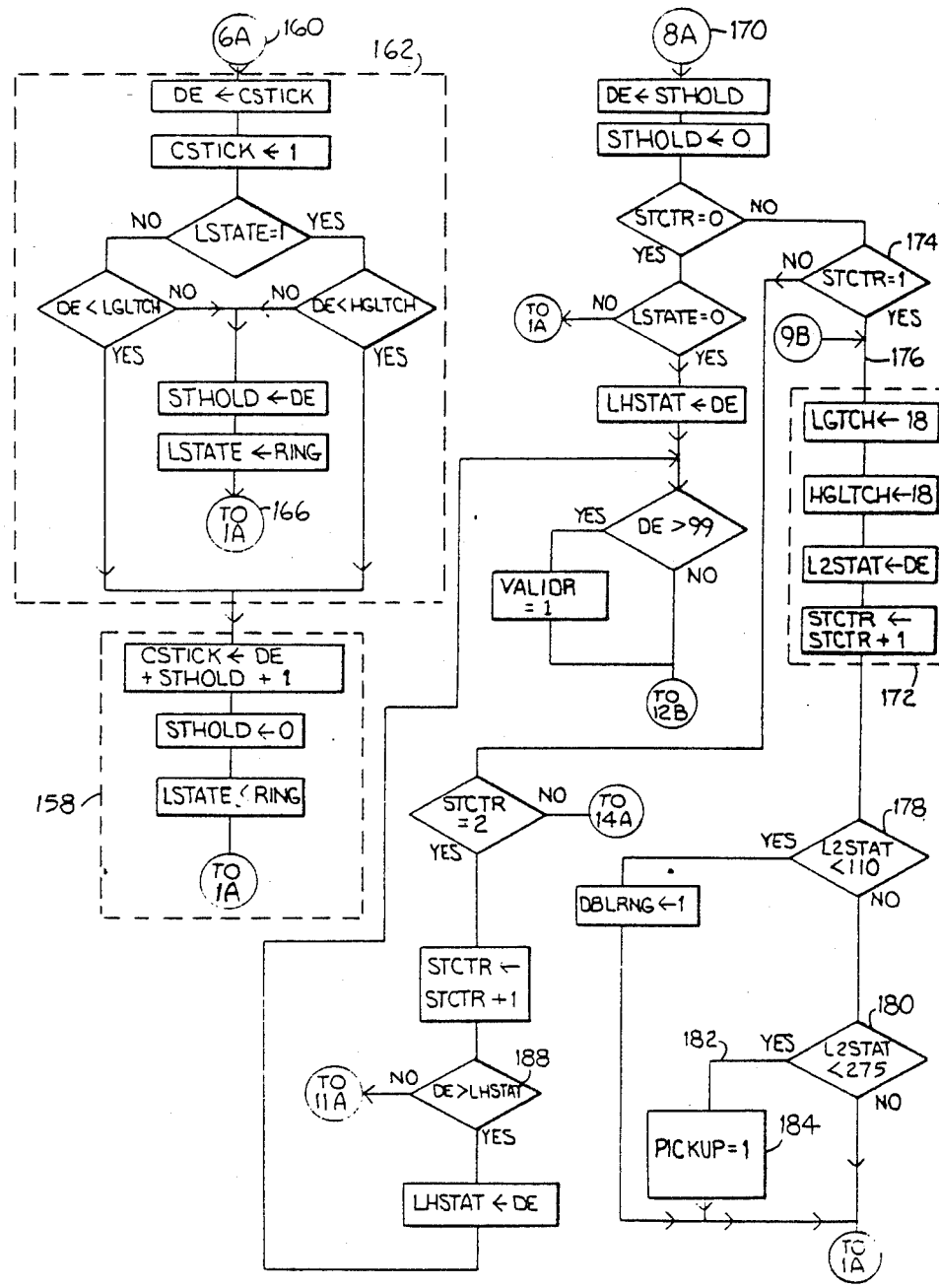

Note that when a change of state on line 40 is detected at step 128, the filter branches to entry point 6A designated as 160 (FIG. 4B). This is the entry point to a set of steps designated as 162. Steps 162 load the value of the tick counter into a temporary variable (DE), sets the counter to one, and tests to see if the previous duration of the tick counter exceeded the appropriate glitch interval. If it did, state hold is loaded with the previous value of the tick counter, the last state (LSTATE) variable is set to the current state of the RING variable and return to entry point 1A is made at branch 166.

Note that steps 162, leading to return point 166, must be taken before the steps beginning at entry point 1A through steps 132, down to branch 138, will lead to the no branch from step 142. This is determined by the fact that the state hold (STHOLD) variable is stuffed with a nonzero value only in the series of steps designated as 162. When this sequence has occurred, the branch to entry point 8A may be taken at branch 168 within steps 140.

Entry point 8A is shown as 170 on FIG. 4B. The filter must entry entry point 8A from the steps previously discussed before the value of the state counter will be incremented. Note the set of steps designated 172 on FIG. 4B. This sequence of steps can only be entered by taking of branch 176 from test step 174. It will be seen from inspection of steps 172 that the variables for the high glitch and low glitch intervals are redefined as a 18 in this sequence. From the discussion of FIG. 3 it should be recalled that the glitch intervals are only defined after a first high has been learned (indicated by the one in the state counter) and when the filter is at least 200 milliseconds into acquisition of the first acquired low. Thus, to arrive at entry point 8A, a value of the variable state hold greater than the previously defined 200 millisecond glitch interval must be present. Thus, the sequence of steps for the digital filter shown as 172 represent the previously described feature of the apparatus. The value 18 for the new glitch intervals is a value corresponding to slightly less than 150 milliseconds.

Also, within steps 172, the first acquired low is loaded into the variable second learned low (L2STAT). From this set of steps, the value of this first acquired low is tested for decision making purposes. Note that the next high value is in the process of being acquired while this is occurring.

At step 178, the value of the first acquired low is tested relative to 900 milliseconds. If it is less than 900 milliseconds, the double ring (DBLRNG) flag is set and the filter returns to entry point 1A. If the first acquired low is less than 900 milliseconds, it is then tested to see if it is less than approximately 2.25 seconds. If it is not, the program returns to entry point 1A. However, if it is, yes branch 182 from step 180 is taken to declare pick-up at step 184. Note that, under these conditions, a declaration of pick-up at the called party's line is made, based only on the knowledge of the first learned high and the first acquired (second learned) low. To get to branch 182, it must be determined that the first valid acquired period of silence on the telephone line after a learned high is of a duration greater than 900 milliseconds and less than 2.25 seconds. While another high is in progress, it is known that periods of silence falling within this range do not correspond to any signals placed on the telephone line by telephone equipment in the United States. Thus, the determination is made that the high presently being acquired, which terminated the first acquired low, is being generated by someone speaking into the telephone at the called station. Note that this will commonly occur when the telephone is answered during a period of silence on the calling party's line and some salutation, such as "hello", is spoken into the phone.

Figure 4C:
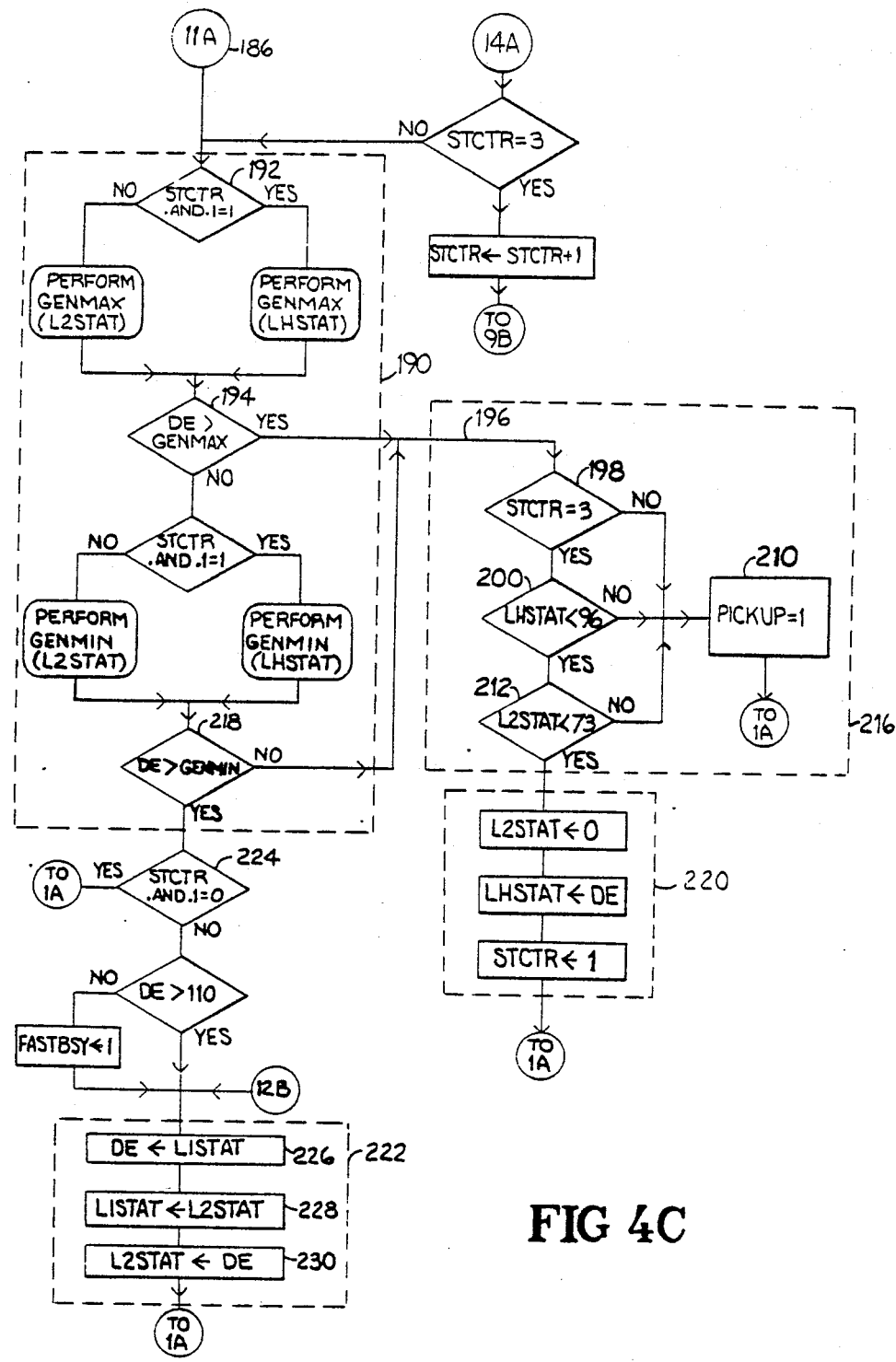
Figure 4D:
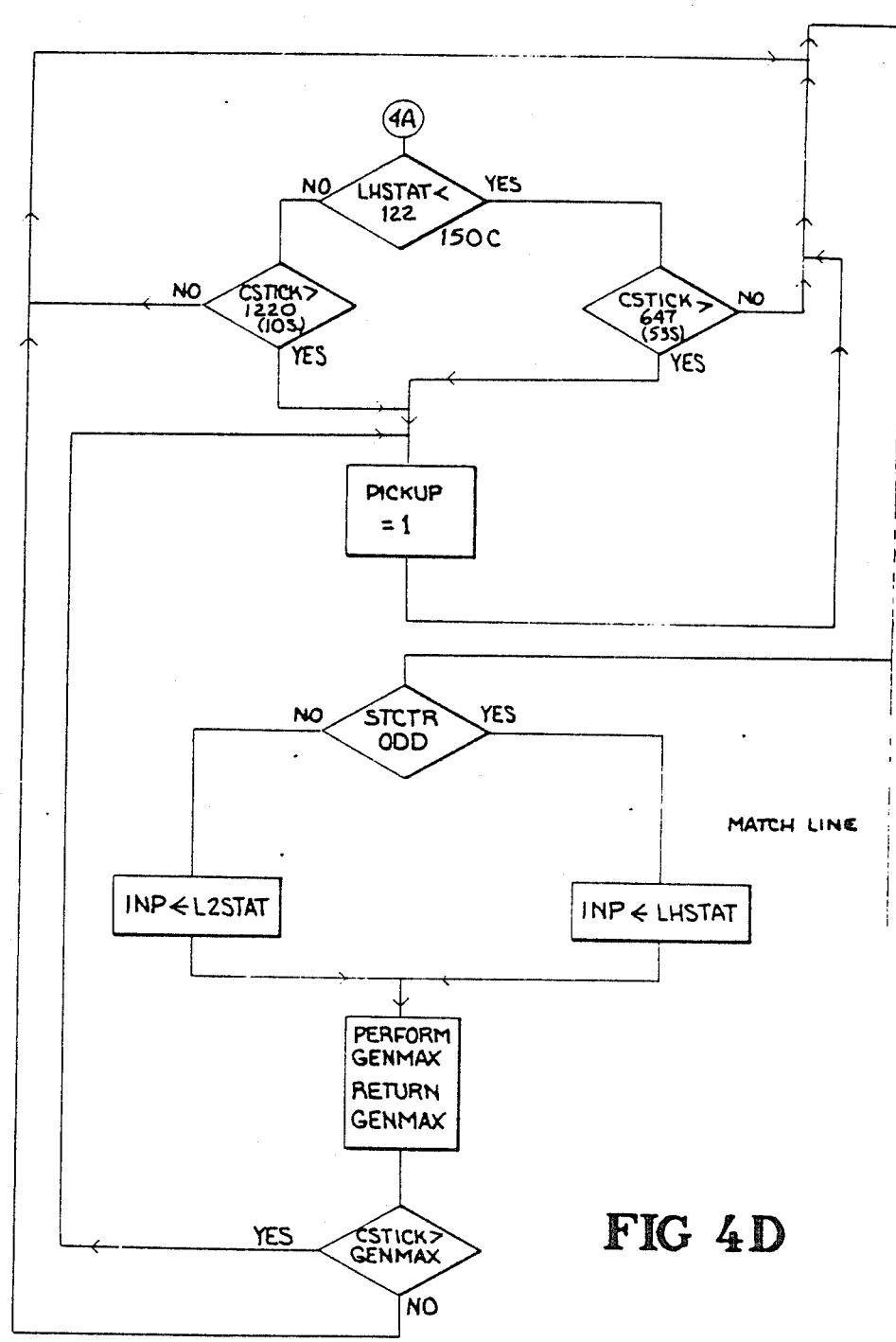

Turning next to some significant sets of steps shown on FIG. 4C, the following should become apparent from inspection thereof. To reach entry point 11A designated as 186, the value of temporary variable DE will have been forced to the previous value of STHOLD, and will have been determined to be greater than the previous learned high state at step 188 (FIG. 4B). Entry point 11a goes to a set of tests, which go to subroutines, designated as 190 on FIG. 4C. Within these tests the parity of the state counter is tested at steps 192 and 194, and the subroutine is performed on either the second learned low or the learned high, as appropriate. Note that the parity of the state counter will determine whether it is the duration of a low period which caused DE to exceed the last high period at step 188, or if tests 190 were entered through entry point 14A.

The subroutines GENMAX and GENMIN are described in connection with FIG. 5. They are fundamentally simple subroutines for providing tolerances to values to be tested in subsequent steps enclosed by line 190. Consider for a moment when branch 196 has been taken into the steps surrounded by dashed line 216. Note that branch 196 comes from the yes branch of either step 194 or the no branch of step 218 within steps 190. Thus entry into branch 196 indicates that an acquired value has exceeded or fallen short of a now learned, and expected, value by an amount greater than the tolerances defined by the subroutines.

The first test conducted is at step 198 to see if the state counter is equal to three. This test being true indicates that it is possible that a long low period of a double ring signal is currently being acquired. See period T4 on FIG. 3A. If however the filter is not in state 3, the fact that the required signal has fallen out of the range allowed for the learned values is sufficient for the no branch to be taken, and for pick-up to be declared at step 210.

If the state counter is in state 3, two subsequent tests are performed at steps 200 and 212. Note that entry into line 196 assumes that a pick-up has probably been made. At step 200, the value of the learned high is tested to see if it is less than approximately 785 milliseconds. If it is not, then the learned high exceeds that period and the filter assumes that the learned high was from a valid ring signal, and the aberation detected within steps 190 indicates a pick-up. Thus, the no branch is taken and pick-up is declared at 210.

If the learned high is less than 785 milliseconds, the status of learned low two is tested at 212. If learned low two exceeds approximately 600 milliseconds, it is assumed that the learned values were generated from a valid ring signal and again the aberation from steps 190 is assumed to have been caused by pick-up. Thus pick-up is declared at 210.

If however the yes branch from step 212 is taken, the sequence of steps noted as 220 is entered. To get to steps 220, an aberation has occurred, the filter is not in state 3, the learned high is less than 785 milliseconds, and the learned low is less than 600 milliseconds. No known combinations of signals applied to the telephone line during normal operations will cause these conditions to exist. However, it should be noted that the scenario described in connection with FIG. 3B often will cause a set of conditions which lead to steps 220 to occur. Whether it be from a sequence of events as depicted in FIG. 3B, or from a very rare noise event on the phone line, the filter basically starts over at steps 220. It clears the learned low two variable, inserts the newly learned variable, which was originally treated as an aberation within steps 190, as the new learned high, sets the state counter to one and proceeds back to entry point 1A.

The last set of set to be discussed in connection with FIG. 4C is steps 222. It will be appreciated from inspection of steps 222 that this sequence of steps is arrived at when steps 190 have been executed without detection of an out-of-bounds value, and the state counter is in an odd state as determined at step 224. Under these conditions, steps 226, 228 and 230 are performed. It may be seen that the learned low one value is assigned to the temporary variable (DE), the current value of learned low two is forced into learned low one and, from the temporary variable, the learned low one is assigned to learned low two. This is the swapping of the learned lows discussed previously in connection with FIG. 3 which allows the digital filter apparatus of the preferred embodiment to implement a digital phase lock loop which locks upon an asymmetric periodic waveform.

Figure 5A:
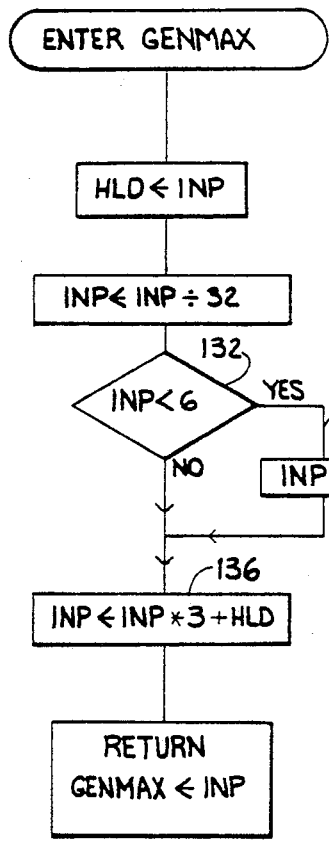
FIG. 5, consisting of FIGS. 5A and 5B is a flow chart of two subroutines used by the digital filter.
Figure 5B:
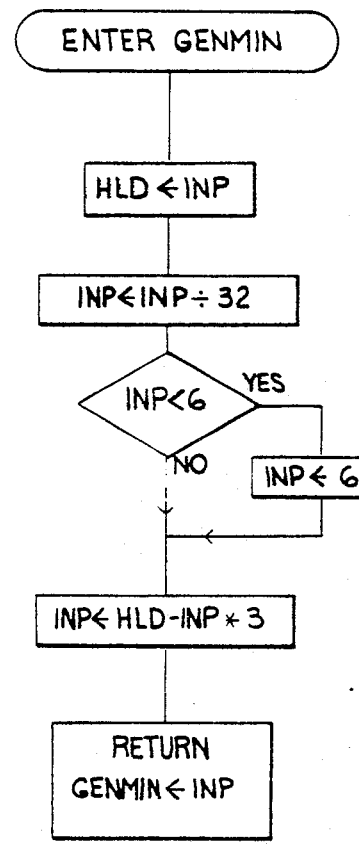

Turning next to FIG. 5, subroutine GENMAX is shown in FIG. 5A and subroutine GENMIN is shown in FIG. 5B. As noted above, these subroutines are very simple and are used to define tolerances which are added or subtracted to variables being tested to determine if a newly acquired value is to be considered greater than a previously learned value. Turning first to FIG. 5A, it will be appreciated that the input variable from the subroutine call is divided by 32, with the quotient being tested relative to six. If the quotient is less than six, the variable is arbitrarily set to six and the variable is then replaced by three times it value, plus the original value of the input variable on the subroutine called.

A short reflection upon the significance of this will indicate the following. Yes branch 134 will be taken from step 132 if the original value of the input variable to the subroutine was less than 192. This corresponds to a time duration of slightly over 1.5 seconds. In the event the input variable was less than this, it will be seen that the variable INP will always be equal to six at step 136, and thus a constant value will always be added to the variable HLD holding the original input value. Since six times three is added to this value an amount equal to eighteen ticks or approximately 150 milliseconds defines the tolerance when the original input value is less than 1.5 seconds. Thus, for those inputs values less than 192, the constant offset is added by the GENMAX routine.

Further inspection of FIG. 5A will indicate that when step 132 tests no, the value of the input variable divided by 32 is unchanged. Thus at step 136, three times the original value of the input variable divided by thirty-two is added to its original value. This may readily be seen to yield a final value for INP which is returned as the GENMAX return variable to be approximately 1.09 times the original value entered.

Thus the GENMAX subroutine adds a constant offset to the variables upon which it operates which are less than a predetermined value, and adds a constant percentage of the variables to input values which exceed or are equal to the predetermined value.

Inspection of FIG. 5B will show that GENMIN is entirely symmetric to GENMAX, except that the returned value is either decremented by a constant value of eighteen ticks (when the input is less than 192), or returns a value approximately 0.91 of the original input value.

It should be understood that the digital filter apparatus described hereinabove was the preferred form of the digital filter operating on the output on line 40 (FIG. 2). It should be noted that the only audio condition on the telephone line to which the digital filter and the filter of FIG. 2 do not respond is a constant period of low output on line 40, which is never interrupted by a high output exceeding the initial glitch interval value. In the preferred form of processor 15 controlling the entire operation of the automatic dialer, the external program controlling the device has access to the state counter (STCTR) of the filter. An external timer is set once the dialing operation has been completed and a failure of the counter to exit the zero state within a predetermined period of time after dialing has occurred is interpreted as a call not completed condition.

The output from counter 35 on bus 91 is also used for decision making within the automatic dialer and the pick-up detection apparatus. When a previous call ha been terminated, and line 21a (FIG. 2) is connected to an available one of subscriber lines 16 (FIG. 1), the output from counter 91 is used to detect the presence of dial tone by processor 15. At this point switching and dialing equipment 18 is caused to commence dialing the next number.

It will be readily appreciated by those skilled in the art that use of an eight-bit counter is the preferred form of counter 35 allows the counter to be used as follows. 1000 hertz is substantially the highest frequency of interest from the output of filter 28. 64 cycles of this frequency (four pulses at point 31 per cycle) may occur prior to counter 35 overflowing. This takes approximately 64 milliseconds or slightly less than eight ticks as defined herein. Thus, sampling contents of frequency counter at regularly spaced intervals such as four to eight ticks provides information as to the frequency content present at point 31. In particular, sampling the contents of bus 91 every four to eight ticks, and storing the difference between a present sample and the immediately preceding sample, testing for variations in this sequence of differences, is alternately used to determine whether a first occurring high (which exceeds the glitch interval) is being produced by a steady ringing signal or a burst of a few hundred milliseconds of an input of widely varying spectral contents, i.e., the human voice. Also, the sequence of differences of output of counter 35 is used, to determine if the familiar three tone sequence applied to the line when an outgoing call is intercepted has caused the first high.

From the foregoing description of the preferred embodiment, it will be apparent that other embodiments of the present invention may be constructed on the principles disclosed herein. Therefore, the scope of the present invention is to be limited only by the claims below.

I claim:

1. Apparatus for providing a digital output signal characterized by being in a first state or a second state, in response to signals on a telephone line comprising in combination:

a band pass filter characterized by a predetermined passband connected to said telephone line for providing a filter output signal on a filter output in response to the presence of said signals on said telephone line within said predetermined passband;

comparator means connected to said filter output for providing a comparator output signal in a first output state in response to said filter output signal being of at least a predetermined threshold level and alternately for providing said filter output signal in a second output state in response to said output signal being less than said predetermined threshold level; and integrating filter means connected to said comparator means for providing said digital output signal and for causing said digital output signal to be in said first state only in response to said comparator output signal making a plurality of transitions from said second output state to said first output state within a second predetermined period of time, each of said plurality of transitions being separated in time from the next one of said transitions by a time period less than a first predetermined period of time, said second predetermined period of time being greater than said first predetermined period of time.

2. Apparatus as recited in claim 4, wherein said integrating filter means includes a retriggerable monostable multivibrator, including a triggering input connected to receive said comparator output signal and a characteristic one-shot timing period less than or equal to the reciprocal of a lowest frequency of interest present in said signal on said telephone line.

3. Apparatus as recited in claim 1, wherein said comparator means is a window comparator and said integrating filter means includes a retriggerable monostable multivibrator, including a triggering input connected to receive said comparator output signal and a characteristic one-shot timing period less than or equal to one-half the reciprocal of a lowest frequency of interest present in said signal on said telephone line.

4. Apparatus as recited in claim 2, wherein said comparator means is a first comparator means, and said integrating filter means further comprises a second comparator means including an input connected to an output from said monostable multivibrator; said input having a resistance-capacitance timing circuit having a characteristic time constant connected thereto for determining said second predetermined period of time; and wherein said characteristic one-shot timing period is said first predetermined period of time.

5. Apparatus as recited in claim 3, wherein said comparator means is a first comparator means, and said integrating filter means further comprises a second comparator means including an input connected to an output from said monostable multivibrator; said input having a resistance-capacitance timing circuit having a characteristic time constant connected thereto for determining said second predetermined period of time; and wherein said characteristic one-shot timing period is said first predetermined period of time.

6. Apparatus for providing a digital output signal characterized by being in a first state or a second state, in response to signals on a telephone line comprising in combination;

a band pass filter characterized by a predetermined passband connected to said telephone line for providing an output signal on a filter output in response to the presence of said signals on said telephone line within said predetermined passband;

comparator means connected to said filter output for providing a comparator output signal in response to said output signal being greater than a predetermined threshold value;

timer means for providing a timer output signal for a first predetermined period of time, said first predetermined period of time being less than or equal to the reciprocal of a predetermined lowest frequency of interest on said telephone line, in response to each occurrence of a transition of a particular sense in said comparator output signal; and integrating output means for providing said digital output signal and for causing said digital output signal to be in said first state only in response to said time output signal being provided by said timer means for at least a second predetermined period of time, said second predetermined period of time being greater than said first predetermined period of time.

* * * * *